United States Patent
Sakaguchi et al.

(10) Patent No.: US 7,833,096 B2
(45) Date of Patent: Nov. 16, 2010

(54) BUTTON ENCOUNTER SYSTEM

(75) Inventors: Hironobu Sakaguchi, Honolulu, HI (US); Takehiro Kaminagayoshi, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 11/221,792

(22) Filed: Sep. 9, 2005

(65) Prior Publication Data

US 2007/0060342 A1 Mar. 15, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/31; 463/8; 463/32; 463/33; 463/34; 463/35; 463/36; 463/37; 463/38; 463/43; 463/44; 463/45; 463/47; 345/419; 345/421; 345/440; 345/473; 711/100; 711/101; 711/115; 711/131

(58) Field of Classification Search ..................... 463/8, 463/31
See application file for complete search history.

(56) References Cited

U.S. PATENT DOCUMENTS 6,203,431 B1 * 3/2001 Miyamoto et al. ............ 463/31
6,210,273 B1 * 4/2001 Matsuno ....................... 463/8
6,273,818 B1 * 8/2001 Komoto ......................... 463/31
6,467,388 B1 * 10/2002 Malakatas .................... 89/41.03
6,533,663 B1 * 3/2003 Iwao et al. ..................... 463/32
6,585,599 B1 * 7/2003 Horigami et al. .............. 463/43
2002/0142834 A1 * 10/2002 Sobue ........................... 463/30
2005/0071306 A1 * 3/2005 Kruszewski et al. .......... 706/47

OTHER PUBLICATIONS

Fire Emblem FAQ, May 9, 2004, http://www.gamefaqs.com/portable/gbadvance/file/468480/23035, Chapter 4.8.*
Benjamin Lu, Fire Emblem: Weapon List, http://www.gamefaqs.com/portable/gbadvance/file/468480/34709, Chapter 5.*
Fire Emblem World Walkthrough, http://www.fireemblemworld.com/index.php?page=fe7walkthrough, Chapter Two.*
IGN:Fire Emblem Image, http://media.gameboy.ign.com/media/499/499430/img_1820354.html.*
IGN Guides:Fire Emblem Guide, http://guides.ign.com/guides/499430/page_7.html, Chapter 14.*
Fire Emblem Review by AceGamez, http://www.acegamez.co.uk/reviews_gba/Fire_Emblem_GBA.htm.*
PlayStation.com—SOCOM II: U.S. Navy SEALs FAQ, http://www.us.playstation.com/PS2/Games/SOCOM_II_U_S_Navy_SEALs/PUGG/faq.html.*
IGN: SOCOM II U.S. Navy SEALs (Release Date), http://ps2.ign.com/objects/552/552397.html.*

(Continued)

*Primary Examiner*—Paul A. D'Agostino
(74) *Attorney, Agent, or Firm*—Workman Nydegger

(57) ABSTRACT

A video game system and method is described in which map scenes and battle scenes are used. A player character may move through the map scene, and upon encountering enemies to battle, an encounter area may be generated and displayed to show the user which enemies will be included in the subsequent battle scene, and which enemies will not be initially included in the battle scene.

21 Claims, 13 Drawing Sheets

OTHER PUBLICATIONS

IGN: Fire Emblem (Release Date), http://gameboy.ign.com/objects/499/499430.html.*

Homeworld IGN Game Review (release date—Sep. 28, 1999), http://web.archive.org/web/20020611065531/http://pc.ign.com/objects/003/003786.html.*

Homeworld User's Manual, http://jarcas.dreamhosters.com/rdocs/Homeworld_-_Manual_-_PC.pdf.*

GameFAQs: Fire Emblem Walthrough by TripleJump, http://www.gamefaqs.com/portable/gbadvance/file/468480/49989, created Jan. 2006-Sep. 2007, pp. 1-13 (gameplay mechanics).

* cited by examiner

BUTTON ENCOUNTER SYSTEM

BACKGROUND

Computerized role-playing games (RPGs) have secured their place in the video game industry as one of the most popular video game types. The attraction typically comes from a mixture of the overall story (or stories) being told in the game, and the underlying game mechanics (e.g., how the characters are improved as the game progresses, how battles are conducted, etc.). In some RPGs, this mixture involves the use of two distinct types of scenes. A first scene, sometimes referred to as a map scene, is intended to show the game player an overall world in which the story (or a current portion thereof) takes place. The map scene may, as its name implies, resemble a topographical map, and may include the various cities, towns, deserts, bodies of water, forests, etc. that exist in the RPG world (or the current portion of the RPG world).

The player's character (which may include a party of multiple individuals), may be represented on the map scene as an icon, and the player may move the character icon around the map to visit different locations in the game's environment. Moving the character through the map scene allows the player to explore the RPG world, and may be a helpful way of moving the story forward.

As the player navigates through an RPG map, many RPGs provide for encounters between the player's character and other entities and/or objects not under the player's control (e.g., the player may encounter a wandering band of thieves). A second type of scene, sometimes referred to as a battle scene, is often used to present such encounters. Using a separate scene may allow for a more dynamic and engaging experience, as the player is shown an up-close view of the battle taking place, and may be given a different variety of actions that can be taken in the battle scene (e.g., certain fighting actions may be available in the battle scene, and the battle scene may show objects that might not be depicted on the map scene due to scale).

There have been two approaches to initiating these encounters from the map scene. In one approach, the map scene depicts icons that represent enemies and/or objects with which the player's character could interact. Such a map scene used a single icon to represent a group of enemies, and when the player character's icon interacted with the enemy icon, the game displayed a transition to a battle scene involving the player's character (or party) and the enemies represented by the icon. This approach helps to simplify the map scene, but also makes it more difficult for the player to anticipate the type of encounters that will occur. A player may be surprised to find that the enemy icon represented a larger number of enemies, or more difficult enemies, than expected, and the player might not enjoy the resulting battle.

In another approach, enemies are simply not shown on the map scene. Encounters in these types of games may appear to the player to occur at random, since the player has no warning in the map scene. This approach may further simplify the map scene, and the surprise nature of the encounters may make for a more exciting game experience, but the player's inability to anticipate, initiate, or avoid the encounter may also lead to some player frustration.

SUMMARY

In one aspect, an encounter area may be generated in the vicinity of the player's icon on a map scene to determine which enemies/objects will be included in a corresponding battle scene. The encounter area may be a visible indication, such as a circle or cylinder surrounding the player's icon. The size of the encounter area may be dynamically determined based on the player character conditions, such as attributes or equipment, and/or a player's controller command. In some aspects, a transition animation may be displayed to transport the player and the enemies/objects within the encounter area to a corresponding battle scene.

In some aspects, the encounter area may be determined for an attack initiated by the player, and the size/shape of the encounter area may depend on the type of attack. An attack using, for example, an area attack (e.g., a shotgun blast, or a magic spell having an area of effect) may cause an encounter area to appear in a particular direction, and may encompass enemies/objects hit by the attack.

In some aspects, enemies and/or objects may leave the battle scene after the battle begins. Similarly, additional enemies and/or objects may enter the battle scene during the fight.

In some aspects, various enemies and/or objects appearing in the map scene may be provided with perception capabilities, such as a sense of hearing, sight, smell, etc., and can behave in response to actions taken by the player character. By manipulating these enemies and/or objects through their perception responses, the player may affect the number and types of enemies/objects that are actually included in a subsequent battle scene.

These and other aspects are described herein.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made to that described herein.

Figure 1:
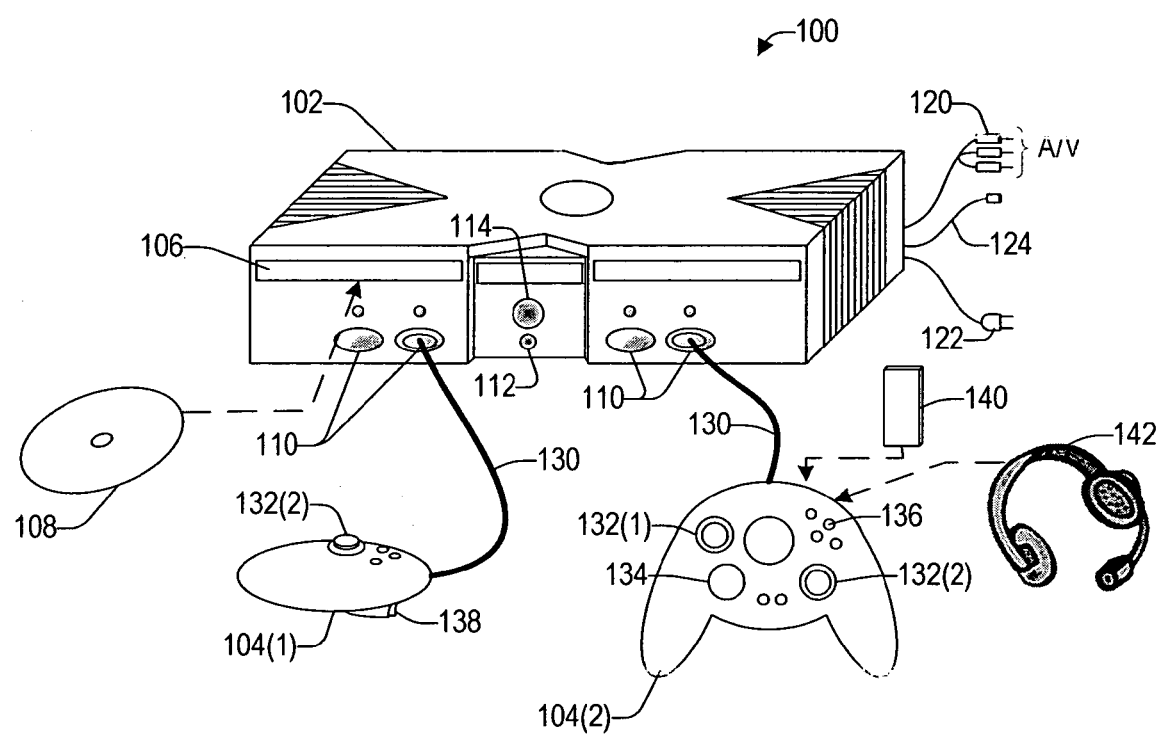
FIG. 1 illustrates a gaming system that may implement one or more of the features described herein.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects described herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and multiple controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
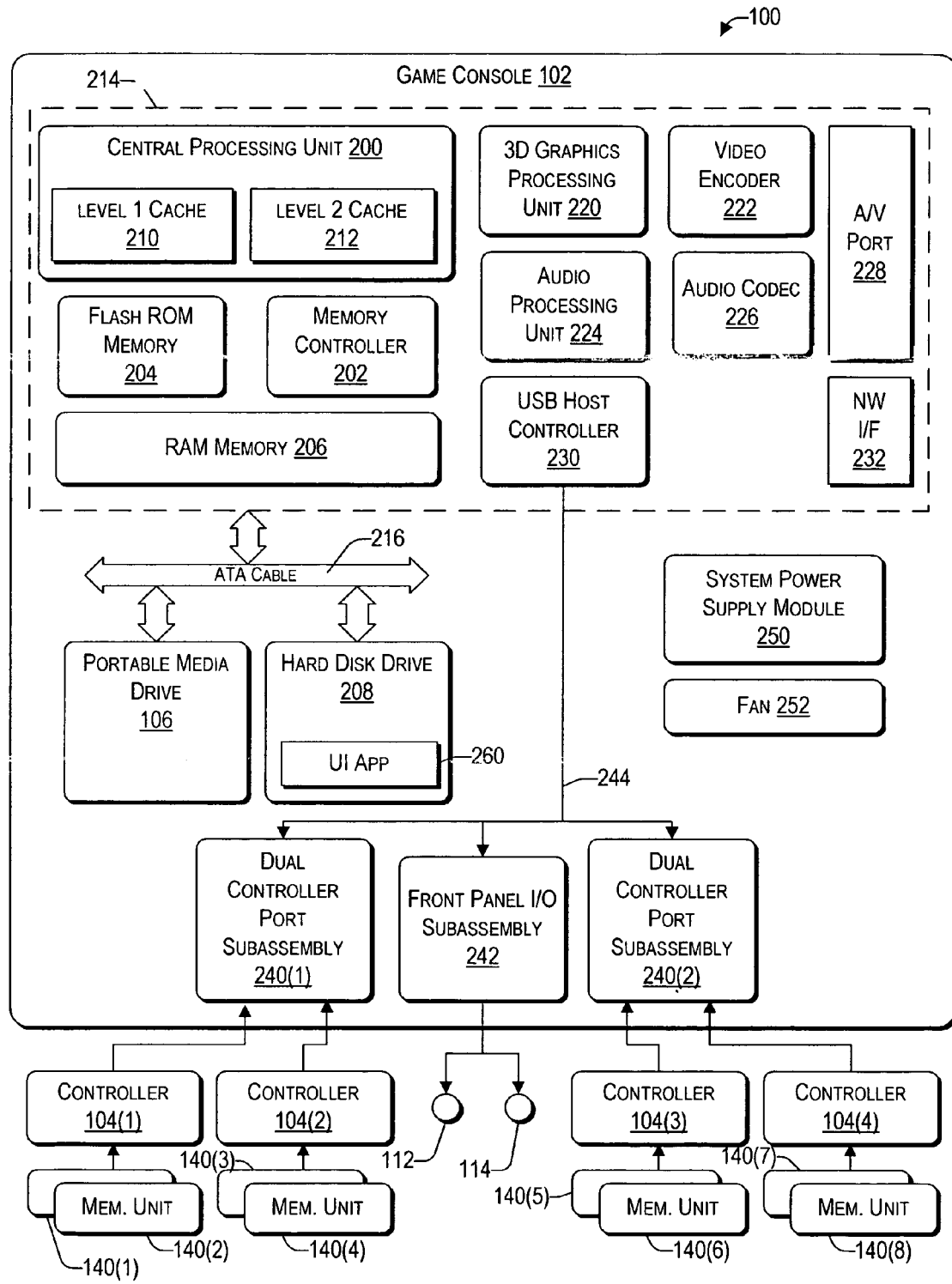
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the Portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., internet, home, network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(I)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
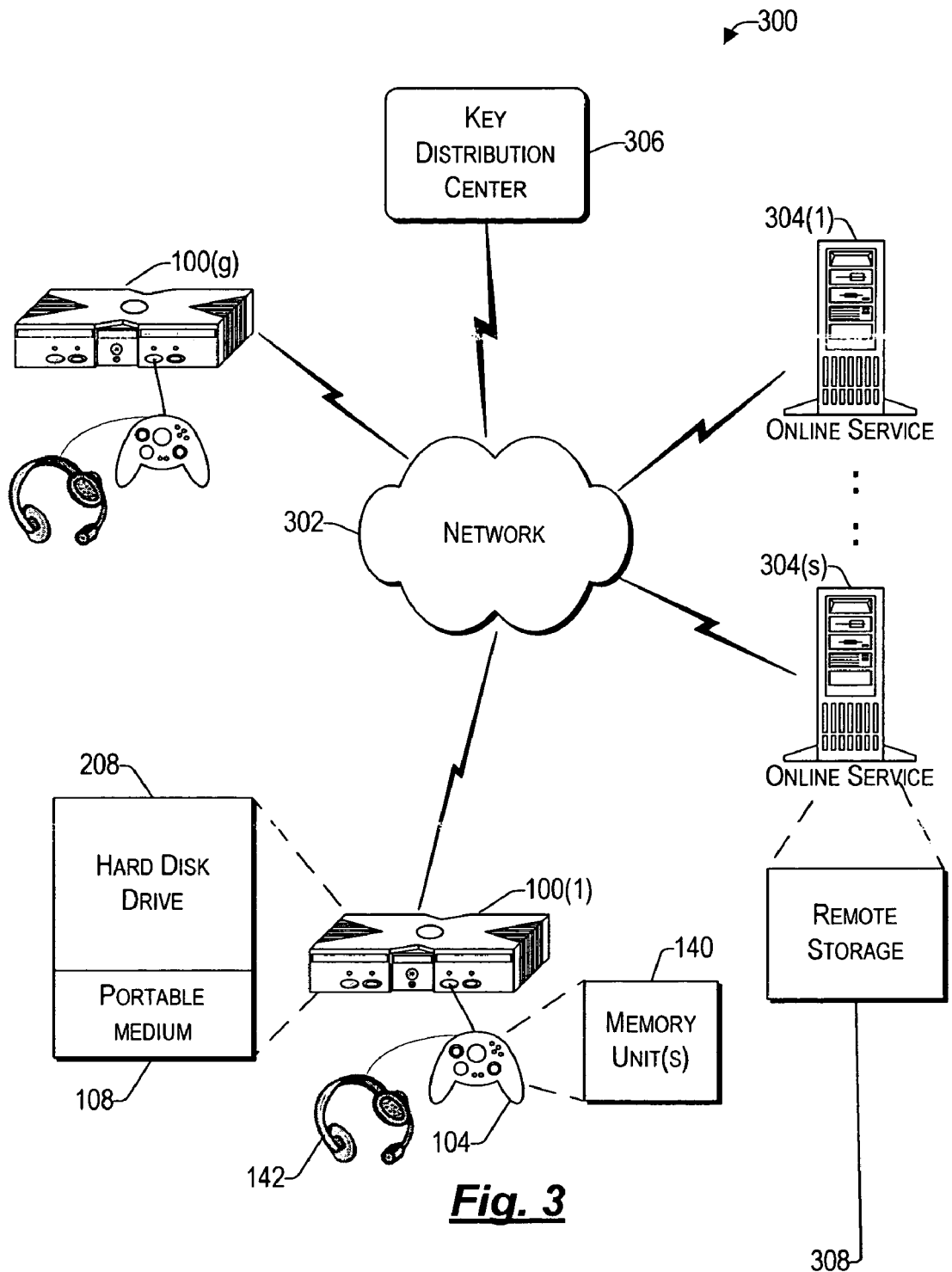
FIG. 3 illustrates a block diagram of a network gaming system that may implement one or more of the features described herein.

FIG. 3 shows an exemplary network gaming environment 300 that interconnects multiple gaming systems 100(1), ..., 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified at remote storage 308 at online service 304(s).

Figure 4:
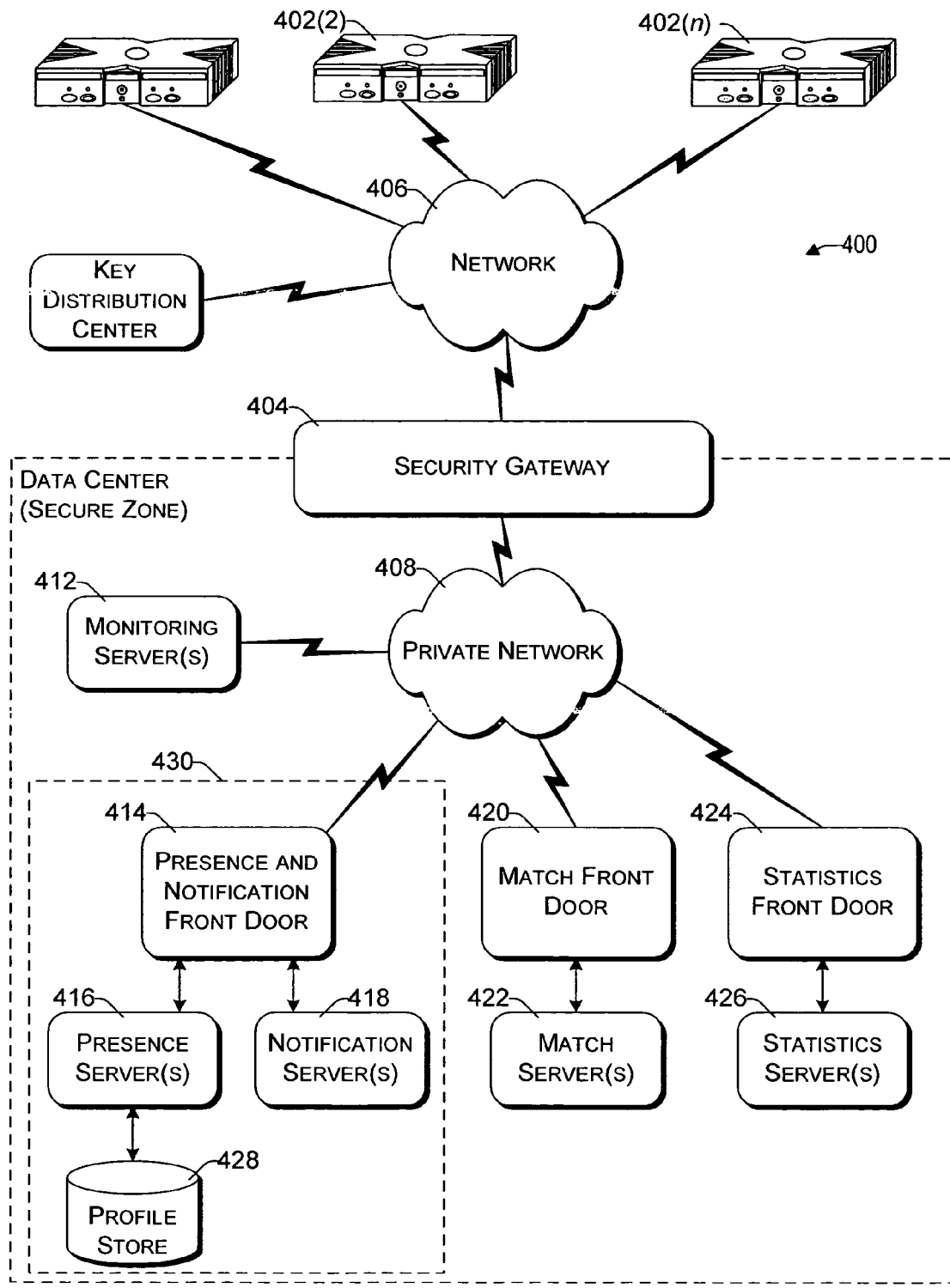
FIG. 4 illustrates another block diagram of an online gaming environment that may implement one or more of the features described herein.

FIG. 4 is a block diagram of another illustrative online gaming environment 400, e.g. XBOX® LIVE by Microsoft Corporation of Redmond, Wash. Multiple game consoles 402(1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center, 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 4118 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more features described herein may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 208, removable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
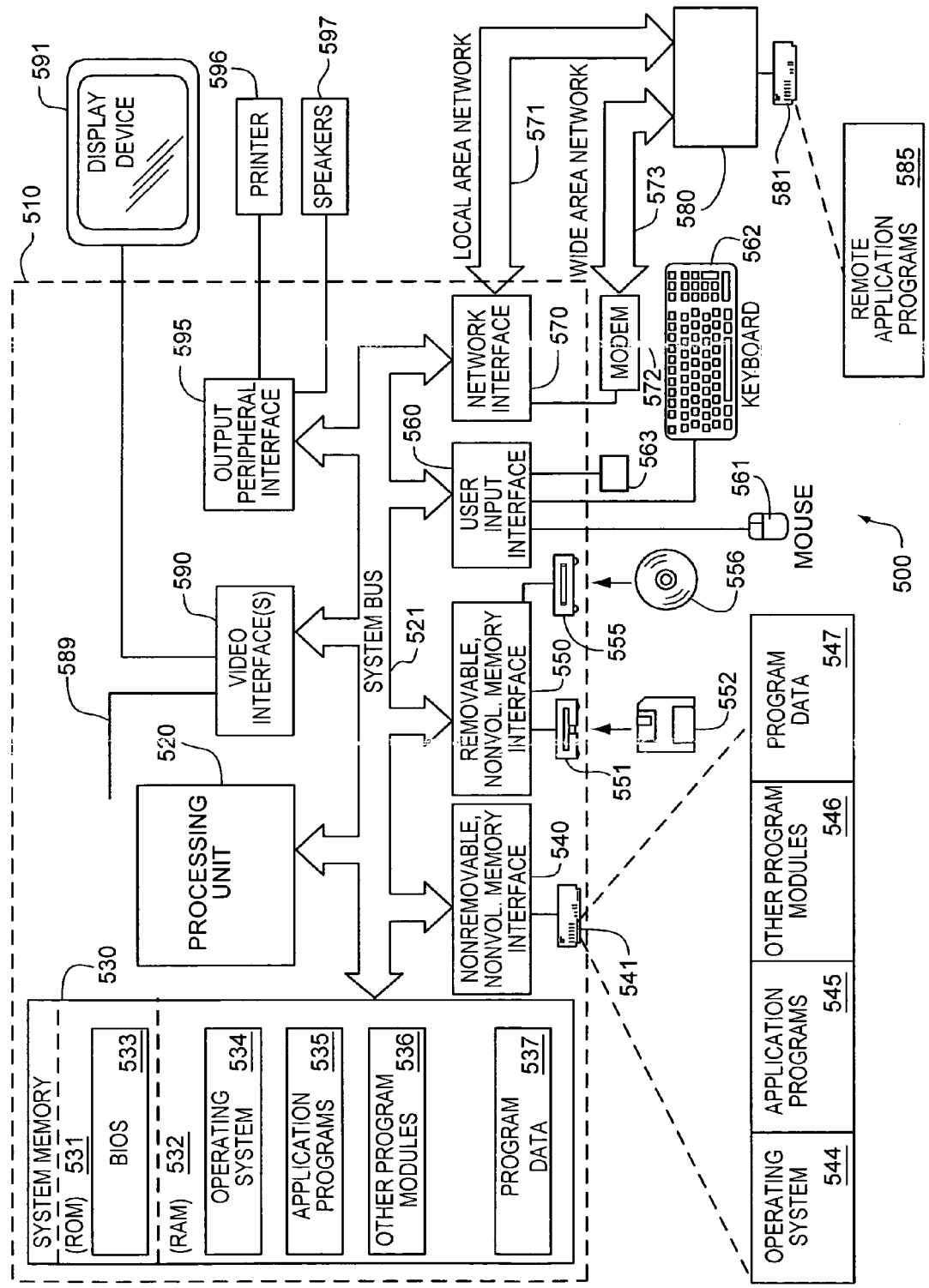
FIG. 5 illustrates a block diagram of a general computing system in which one or more features described herein may be implemented.

Aspects described herein are not limited to console computing environments. Indeed, these aspects may also be implemented in video games that operate on personal computers (PC). FIG. 5 illustrates an example of a suitable computing system environment 500 on which the features described herein may be implemented. The computing system environment 500 is only one example of a suitable computing environment and is not intended to suggest any limitation as to the scope of use or functionality of the features described herein. Neither should the computing environment 500 be interpreted as having any dependency or requirement relating to any one or combination of components illustrated in the exemplary operating environment 500.

The features herein are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features herein may be described in the general context of computer-executable instructions, such as program modules, being executed by a computer. Generally, program modules include routines, programs, objects, components, data structures, etc. that perform particular tasks or implement particular abstract data types. The features may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the features described herein includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. Computer readable media is divided into two separate categories: computer storage media and communication media. Computer storage media includes both volatile and nonvolatile, and removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices (in the singular or the plural). Computer storage media, however, does not include signals. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Figure 6A:
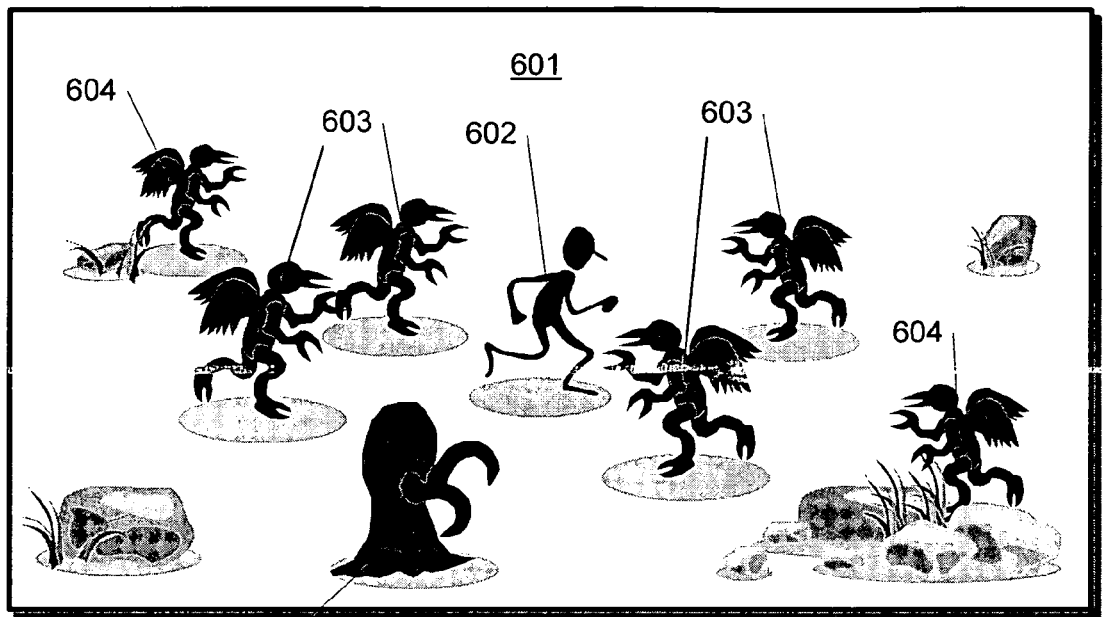
FIGS. 6a-c illustrate an example sequence of screens showing an encounter area in a map scene and a corresponding battle scene.
Figure 6B:
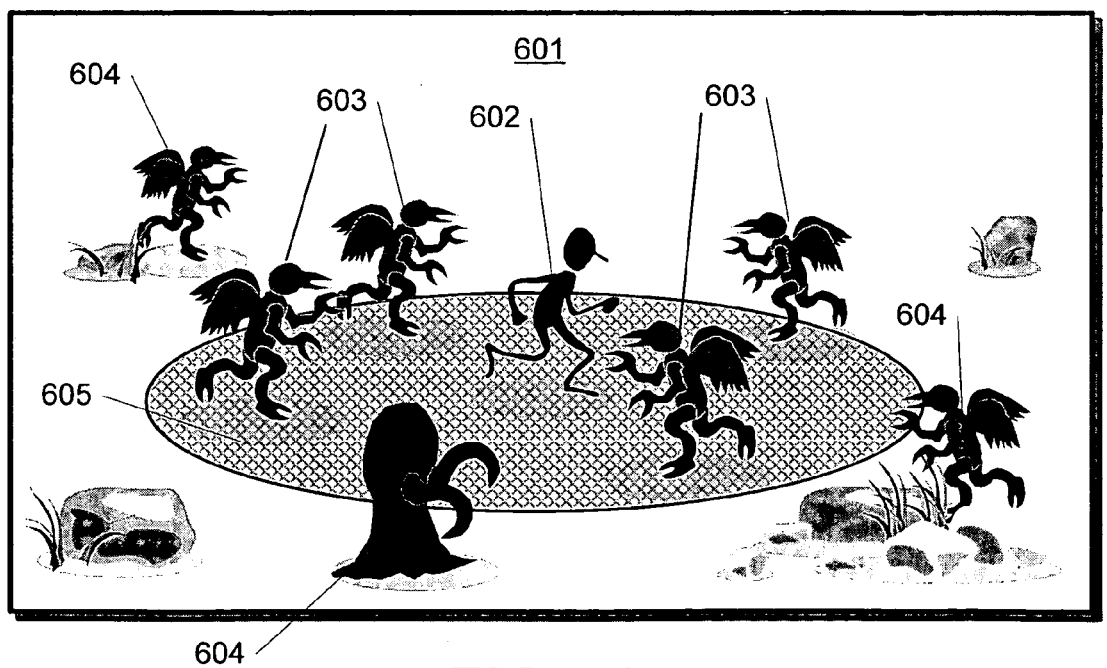
Figure 6C:
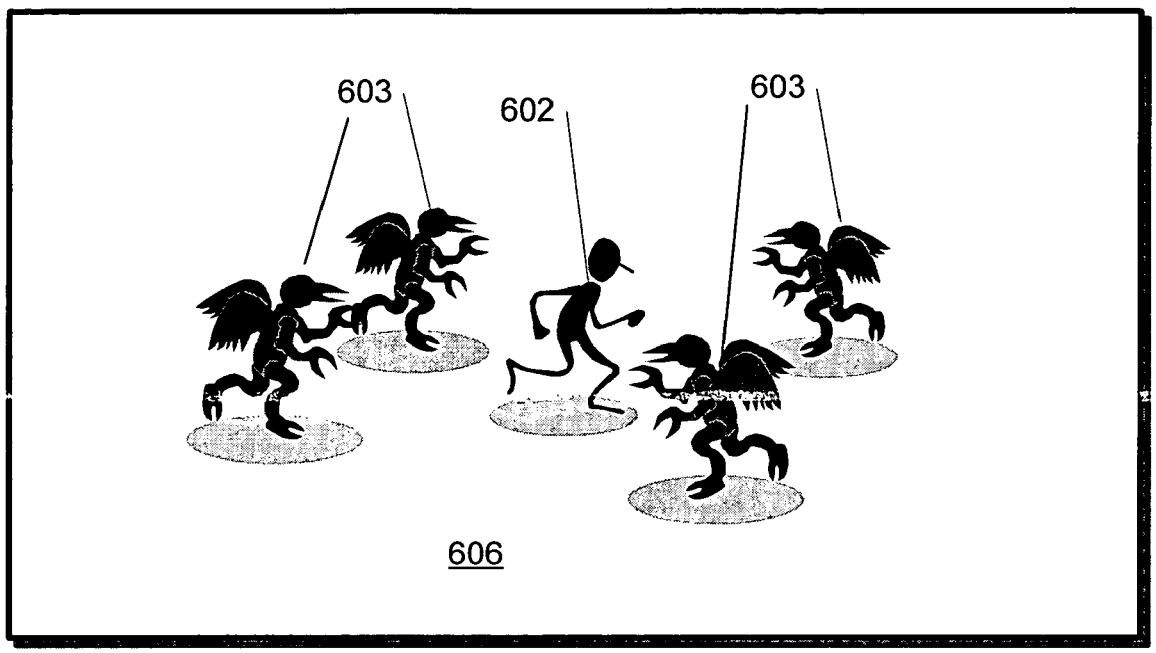

FIGS. 6a-6c illustrate an example of a map scene 601 that may appear in a video game operating on any of the systems and/or devices shown in FIGS. 1-5. These screens may be generated through the use of computer-readable instructions stored on a computer-readable medium (e.g., one or more CD-ROMs, DVDs, etc.) executed by the systems and/or devices shown in FIGS. 1-5. Map scene 601 may primarily be used by the player to move the player's character through the RPG world or environment. The scene 601 may include an animated icon 602 representing the player's character (which, as discussed above, may include a party of multiple individuals). In addition to the player's own character, the map scene 601 may also include icons 603, 604 corresponding to other enemies and/or objects in the environment, some of which may be interactive.

The map scene 601 is not limited by scale, and may be a large scale map (e.g., resembling a topographical map, showing cities, towns, mountains, etc.), or it may be a smaller scale map (e.g., showing a closer view of the character's immediate surroundings). The example map scenes shown in FIGS. 6a-b depict a closer view of the character's surroundings.

As the player character 602 moves through the map scene 601 environment, the player character may encounter enemies (e.g., computer-controlled enemies, or player controlled enemies in a multi-player game) that may be overcome through combat. The actual battle may be handled in a different scene, such as a battle scene, in which a greater emphasis may be given to combat. This emphasis may take the form of a difference in animation and appearance, and/or a difference in the available commands. For example, although navigation-related appearances (e.g., displaying a compass) and commands (e.g., opening a map, marking waypoints, etc.) may be more important when the player character is moving through a map scene, combat-related appearances (e.g., character ammunition, health level, etc.) and commands (e.g., firing a weapon, casting a magical spell, punching, etc.) may be more important when the player is engaged in combat during a battle scene. The different map and battle scenes may have different displays and/or available commands accordingly. For example, contextually-appropriate commands may be mapped to the player's controller (e.g., 104), so that in a map scene navigation commands may be mapped to the controller buttons 136 (e.g., X, Y, A and B buttons), while in a battle scene combat commands may be mapped to those same buttons. This mapping may help make the game easier to play. Commands that are not fully contextually-appropriate (e.g., a set waypoint command during a battle scene) may still be available to the player through other mechanisms, such as a pop-up menu or a pause menu.

When an encounter is beginning, the game system may generate an encounter area 605, as shown in FIG. 6b, to determine which enemies (if any) appear in the battle scene. The encounter area 605 may be displayed on the map scene 601 to illustrate an area of the map in which enemies will initially be fought, to identify those enemies 603 that will initially be engaged in an encounter or battle, and to identify those enemies 604 that will not. This display may be made in any manner. For example, the encounter area 605 of the scene may be given a different color (e.g., red, black, etc.), or a different shading (e.g., heavy, light, stripes, dots, etc.). The encounter area 605 need not be displayed to have effect. For example, the icons for enemies 603 that are within the encounter area 605 may be altered to indicate that they would be included in a battle scene. This alteration may be done, for example, by highlighting, glowing, or otherwise changing the appearance of those enemies 603. In some alternative aspects, all enemies appearing on the map scene screen appear in the battle scene.

When the enemies for the battle scene have been identified, the game system may offer the player the option of canceling the combat by entering a predefined button command (or by failing to enter a command required for combat). This may allow players to change their minds when, for example, the encounter area 605 includes more enemies than the player wishes to fight at once. If the player elects to continue with the battle, the game system may then switch the display to show the resulting battle scene, and conduct the ensuing battle. FIG. 6c illustrates an example battle scene 606, in which the player's character 602 may combat against the enemies 603 that were within the encounter area 605 in the map scene 601. In some aspects, a transition animation may be used between the map scene and battle scene to alert users that they are about to engage in a battle, and to create a more dynamic game experience. Transition animations may take many forms, and may include, for example, fading in/out, wiping, or any other form of desired transition animation.

The example encounter area 605 is shown as a circle centered about the player's character. This encounter area 605 need not be a circle, and may instead be any shape (e.g., square, rectangle, hexagon, triangle, oval, etc.), and may be three-dimensional. It may also have a dynamic size that can vary depending on user-defined (or game-defined) game settings and characteristics. For example, the game system may establish a default encounter area size based on the player's character/party conditions. A player character's equipped items, such as helmet, goggles, magical objects, clothing, weapon, etc. may help determine the area's size, and changing equipment may result in a changed encounter area shape and/or size. The character's attributes (e.g., skill level, magic effects, etc.) may also affect the area's size, so that, for example, a more perceptive character may have a larger encounter area, while a less perceptive one might have a smaller encounter area. Again, changes in character attributes may also cause a corresponding change in the encounter area.

The size may also dynamically vary based on a player's command at the beginning of the encounter. For example, the player might first initiate an encounter area 605 in the map scene by pressing a predetermined button on controller 104 (e.g., the X button). The encounter area 605 may start at a first size (e.g., a very small size centered about the player's character), and may change in size while the player holds the button down, so that the player can choose a larger (or otherwise different) encounter area by holding the button down longer. Similarly, the encounter area size can also be adjusted based on an amount of pressure with which the player presses the button, so that a player can choose a larger (or otherwise different) encounter area by pressing the button harder. Other player inputs can also be used to dynamically change the size of the encounter area 605. By changing the size, and displaying the resulting encounter area 605, the user may be given feedback as to the specific enemies that would be encountered in the battle scene based on the current encounter area. If the player inadvertently selects an encounter area 605 size that includes too many, too few, or the wrong enemies on the map scene, the player may be given the option of canceling the battle by entering another command, such as pressing a different button, or failing to enter a required command for battle.

Figure 7A:
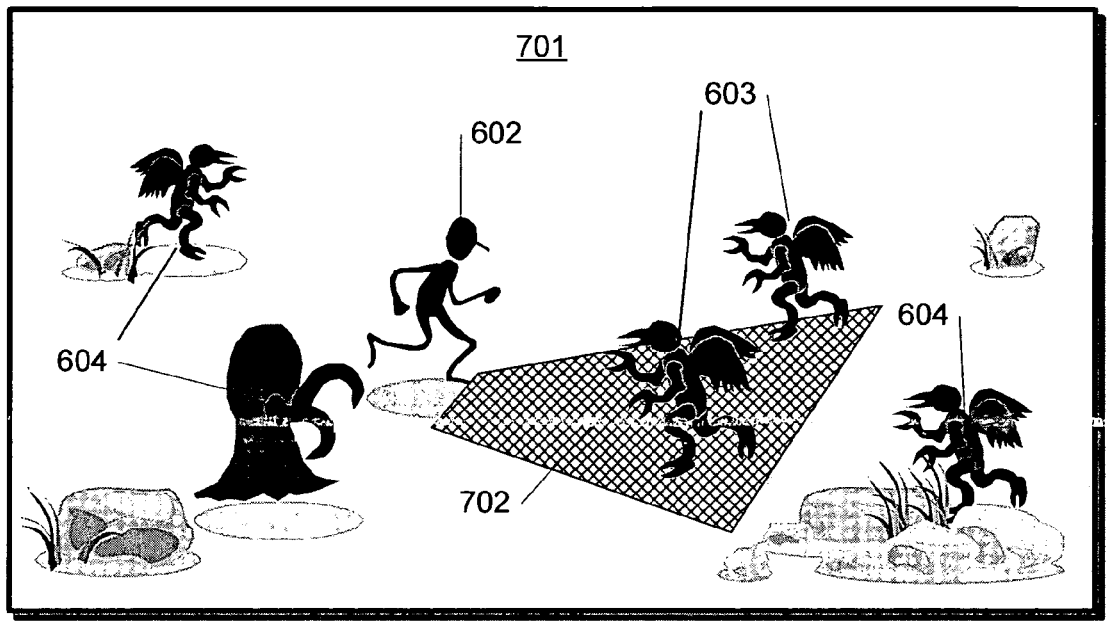
FIGS. 7a-d illustrate a variety of example encounter areas that may be used.
Figure 7B:
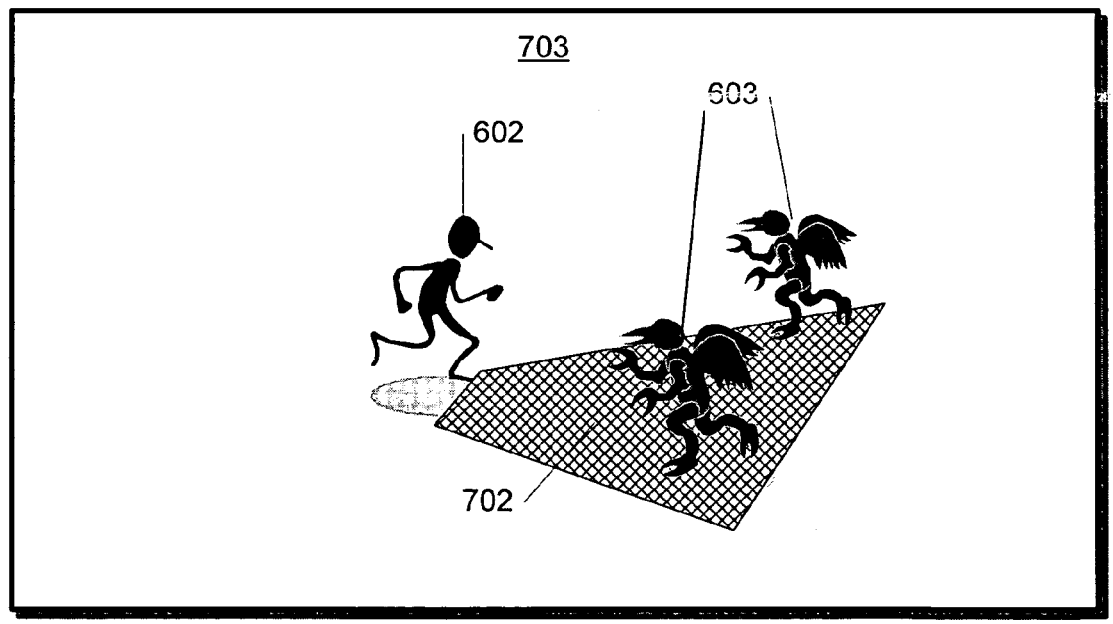
Figure 7C:
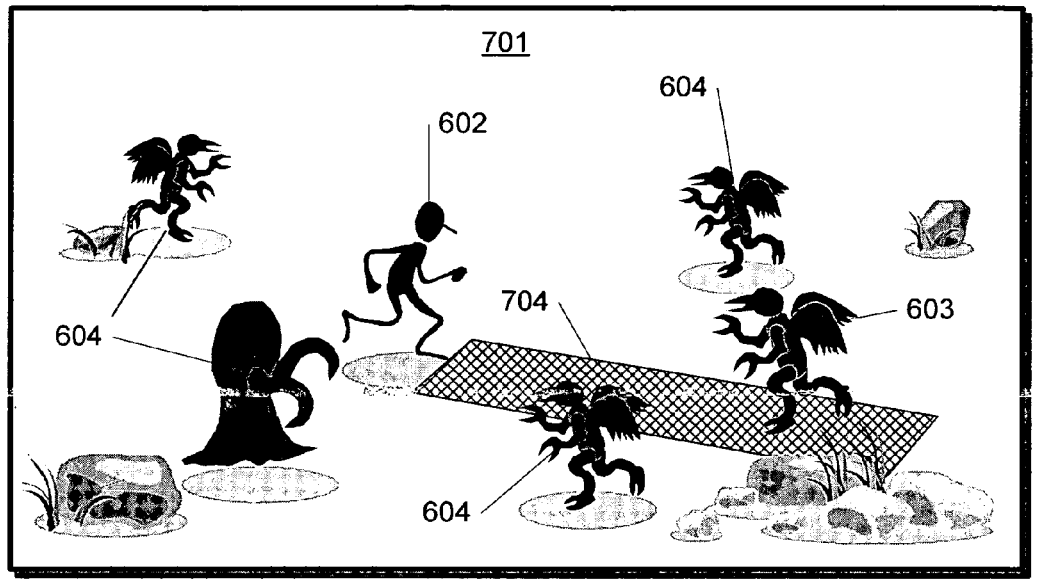
Figure 7D:
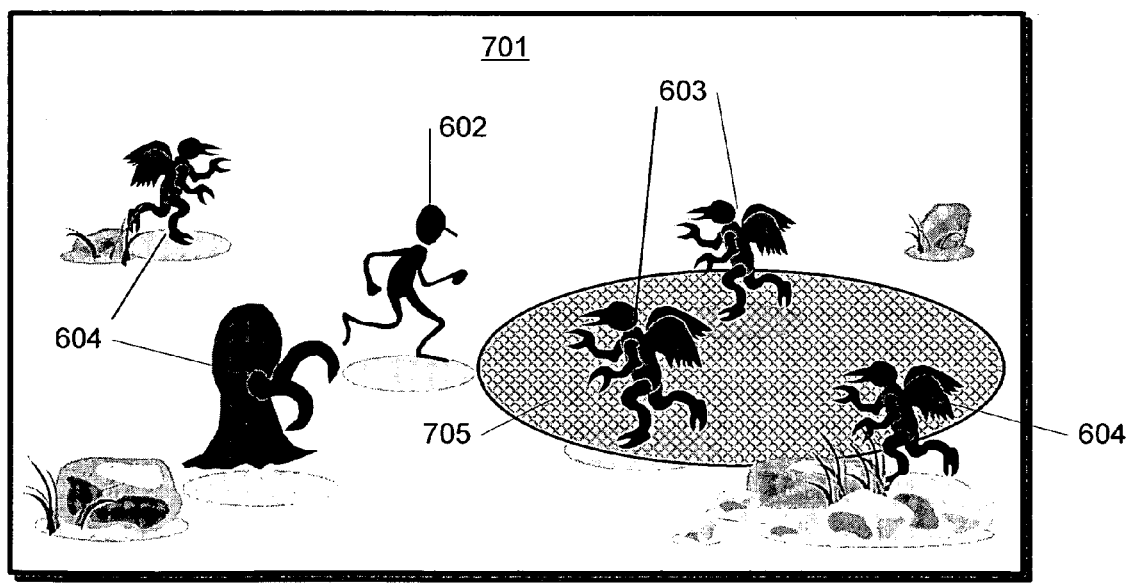

The encounter area's size and/or shape may also be dynamically determined based on the specific type of command entered by the player. The player may choose one encounter area's size and/or shape from a plurality of available sizes and shapes. The encounter area's appearance may also depend on an attack initiated by a player in the map scene. For example, a player may cause a character 602 to attack an enemy 603, and the encounter area may take the shape of the area affected, or successfully hit, by the character's attack. FIG. 7*a* illustrates an example map scene 701 in which the player character 602 initiates an expanding forward area attack, such as a shotgun blast, resulting in a different encounter area 702. The encounter area 702 may extend in the area affected by the attack, and may include enemies 603 that are hit by the initial attack. Enemies 604 not hit by the attack would appear outside of the encounter area 702, and would not appear in the battle scene 703, shown in FIG. 7*b*. Other types of attack encounter areas may also be used. For example, a long-range attack focused on a single target (e.g., a sniper rifle, bow and arrow, etc.) might have a slender, elongated encounter area 704 as shown in FIG. 7*c*. A remote area attack (e.g., a hand grenade or magical spell) might have an encounter area 705 centered at a location on the map scene that is remote to the player's character icon 602, where the encounter area 705 may also exclude the player's character 602.

Figure 8:
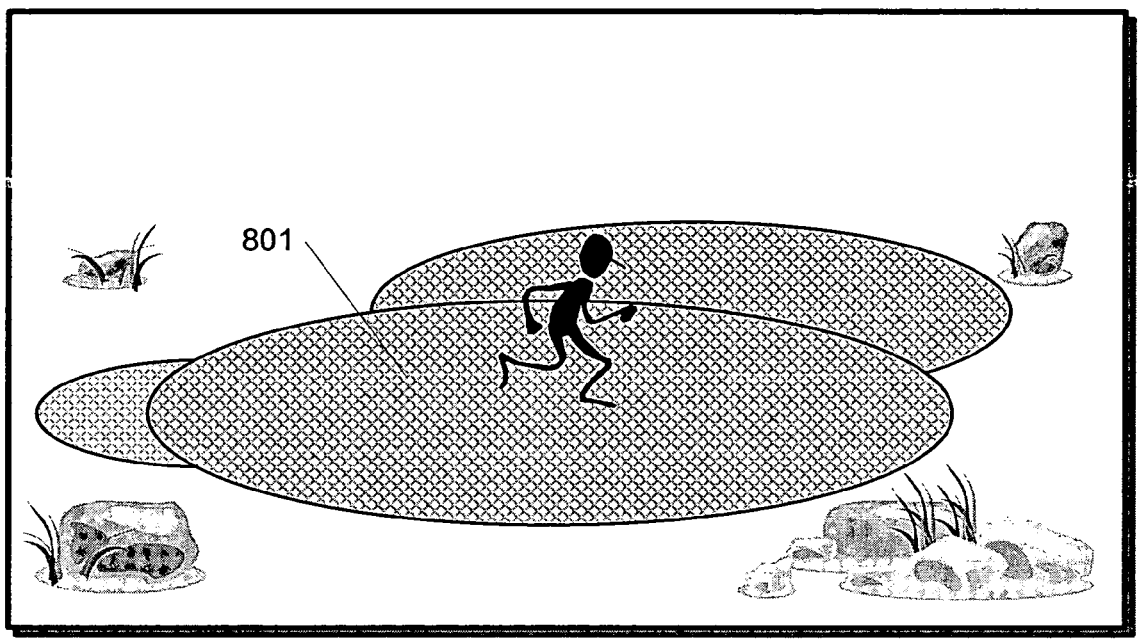
FIG. 8 illustrates an example encounter area resulting from an aggregation of multiple individual encounter areas.

Other variations in the shape of the encounter area may occur as well. In some instances, multiple characters in a player's party may each have a different encounter area depending on their own equipment, skill level, position in the party (e.g., standing in the front, standing in the back, etc.) etc., and the aggregate encounter area may be displayed on the map scene. FIG. 8 shows an example of such an aggregation, which can result in an irregularly-shaped area 801. Furthermore, the encounter area does not have to be a two-dimensional area, and may alternatively be a three-dimensional volume. Other encounter area shapes and sizes may be used. For example, an encounter area may have the shape of a shadow cast by one or more characters/objects in the map scene. Such a shadow-based encounter area may be manipulated by the player by, for example, moving the character in relation to a light source in the map scene to cause the shadow to encompass one or more desired enemies.

As noted above, a battle scene may include enemies 603 that were within the encounter area from the map scene. The ensuing battle need not, however, be restricted to those enemies, as enemies may be added and/or removed during the course of the battle. For example, if an enemy 603 in the battle scene happens to be a cowardly enemy, or one configured to warn other enemies, the enemy may flee the battle scene and return (after a period of time) with reinforcements. Additionally, enemies 604 that were originally outside of the encounter area may remain in their positions as previously shown in the map scene, or they may continue moving about (as a background process not necessarily shown in the battle scene), and may eventually wander into the encounter area (and thus be included in the battle scene) during the course of the battle. For example, enemies 604 that were originally outside of the encounter area may perceive the sounds and/or sights of a battle, and react accordingly to enter the battle scene.

As noted above, the various characters 603, 604 and/or objects in the map scene may be programmed to exhibit certain perceptive behavior (e.g., a simulated sense of smell, sight, hearing, extra-sensory perception, etc.) and react accordingly (e.g., some characters may be cowardly and run from a potential encounter, some may seek reinforcements and/or raise alarms, and others may be drawn to potential encounters). The player can take advantage of these behaviors to manipulate the various enemy characters 603, 604 on the map scene.

Figure 9A:
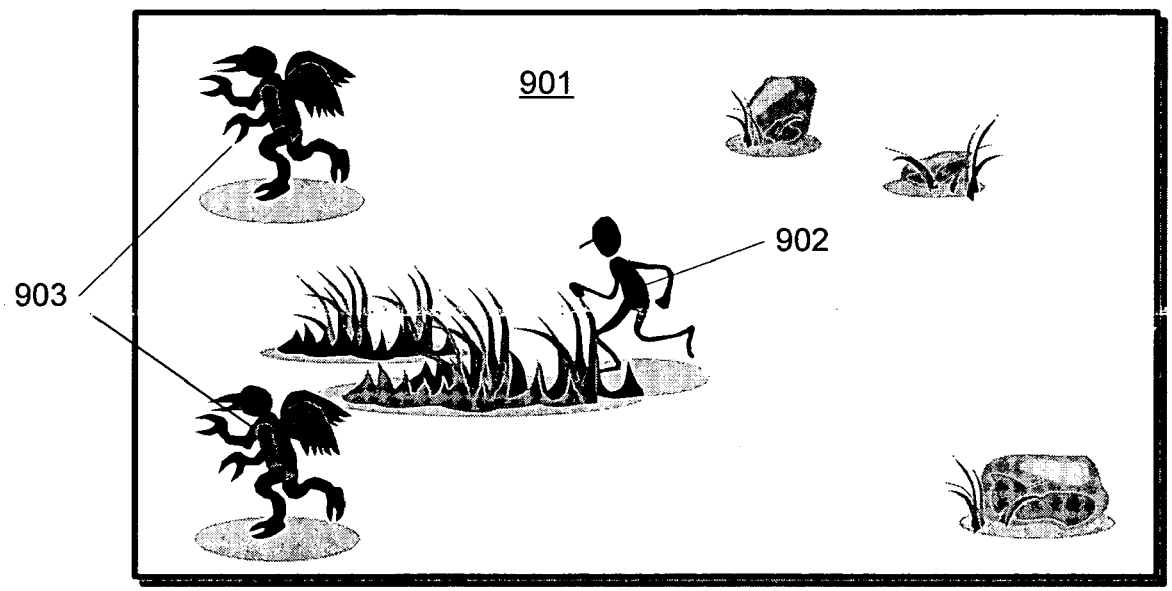
FIGS. 9a-d illustrate an example sequence of screens showing how a player character can use enemy perception abilities to manipulate enemies into an encounter.
Figure 9B:
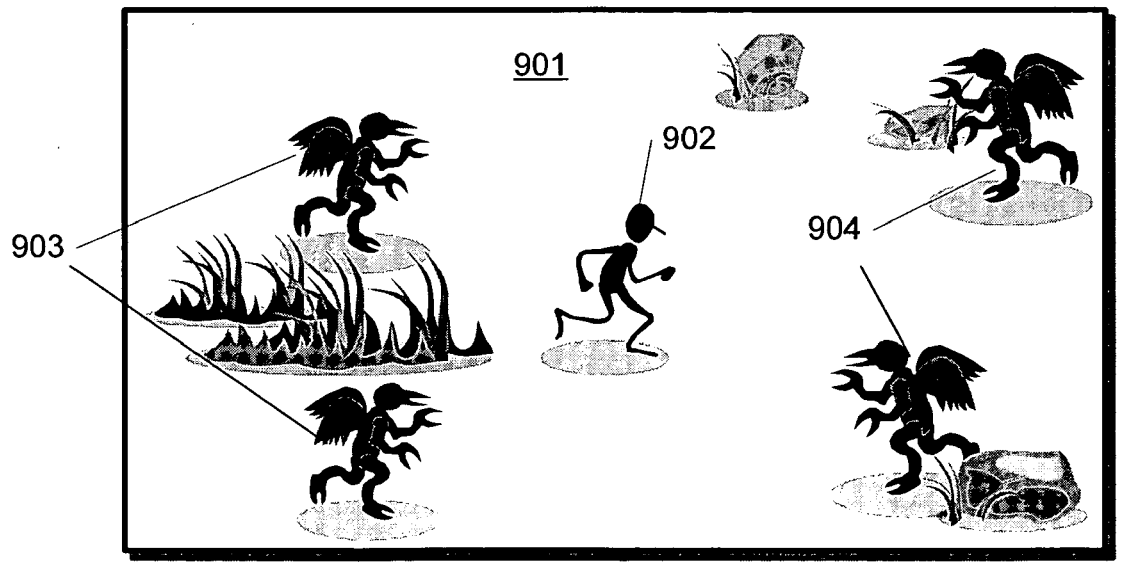
Figure 9C:
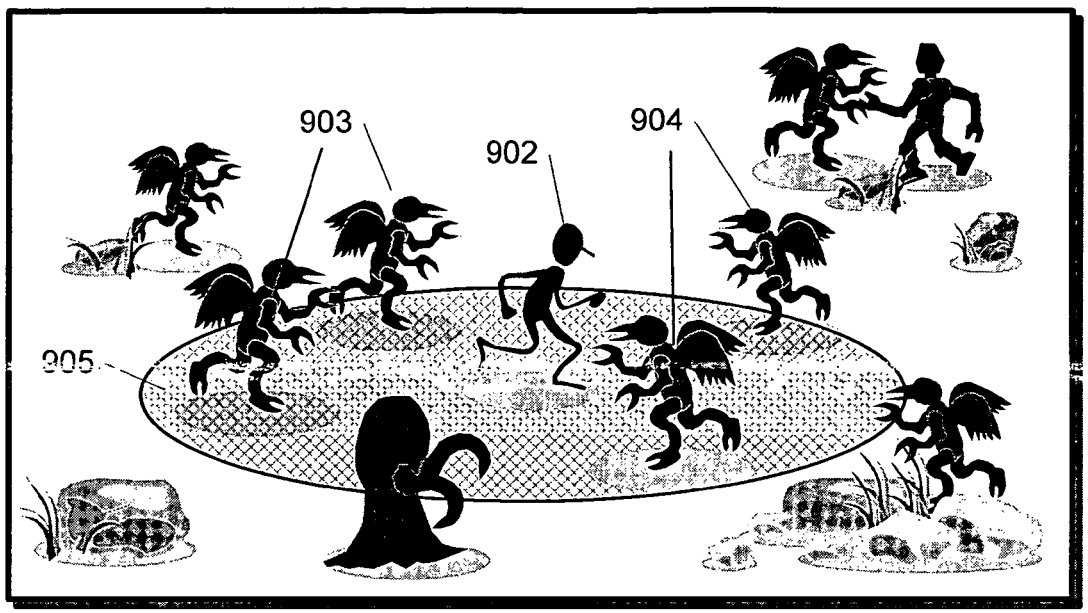
Figure 9D:
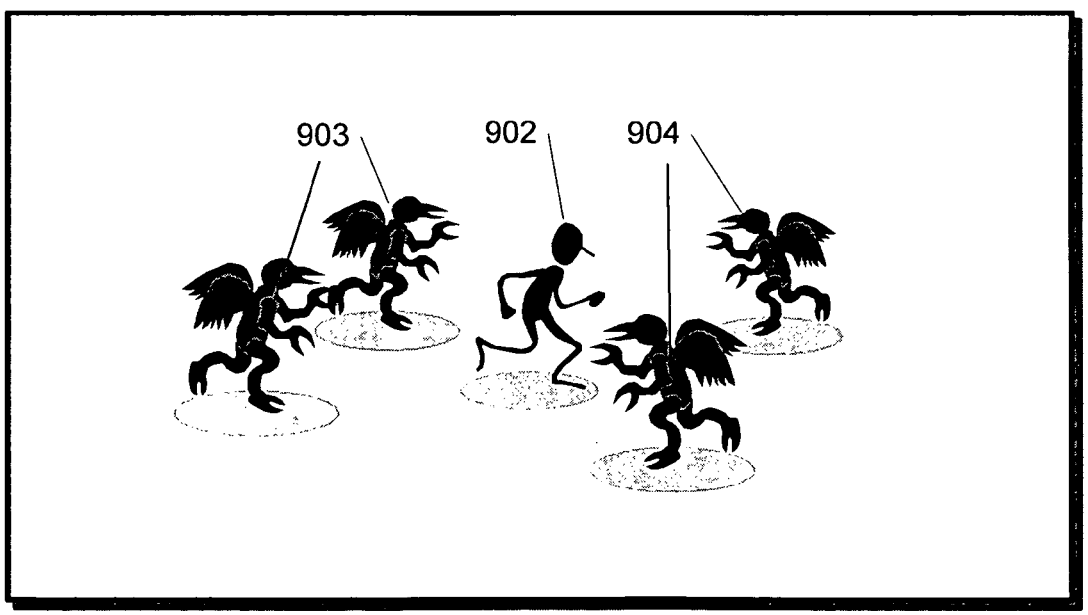

FIGS. 9*a-d* illustrate an example sequence of map scene 901 screen showing such enemy manipulation. First, in FIG. 9*a*, a player character 902 may approach enemies 903. The player character 902 may make a sound, give a scent, or be seen by enemies 903, who may move towards the player 902 to investigate, as shown in FIG. 9*b*. Other enemies 904 may also move closer to investigate. When the player is satisfied with the number of enemies nearby, the player may initiate an encounter and open an encounter area 905 encompassing the nearby enemies, as shown in FIG. 9*c*, and those nearby enemies would then appear in the resulting battle scene shown in FIG. 9*d*. Different enemy characters may move away from, or towards, the player character 902 in response to detection, and by using this behavior to manipulate the enemy characters, the player can have a greater degree of control over the enemies confronted in a given battle scene.

Figure 10:
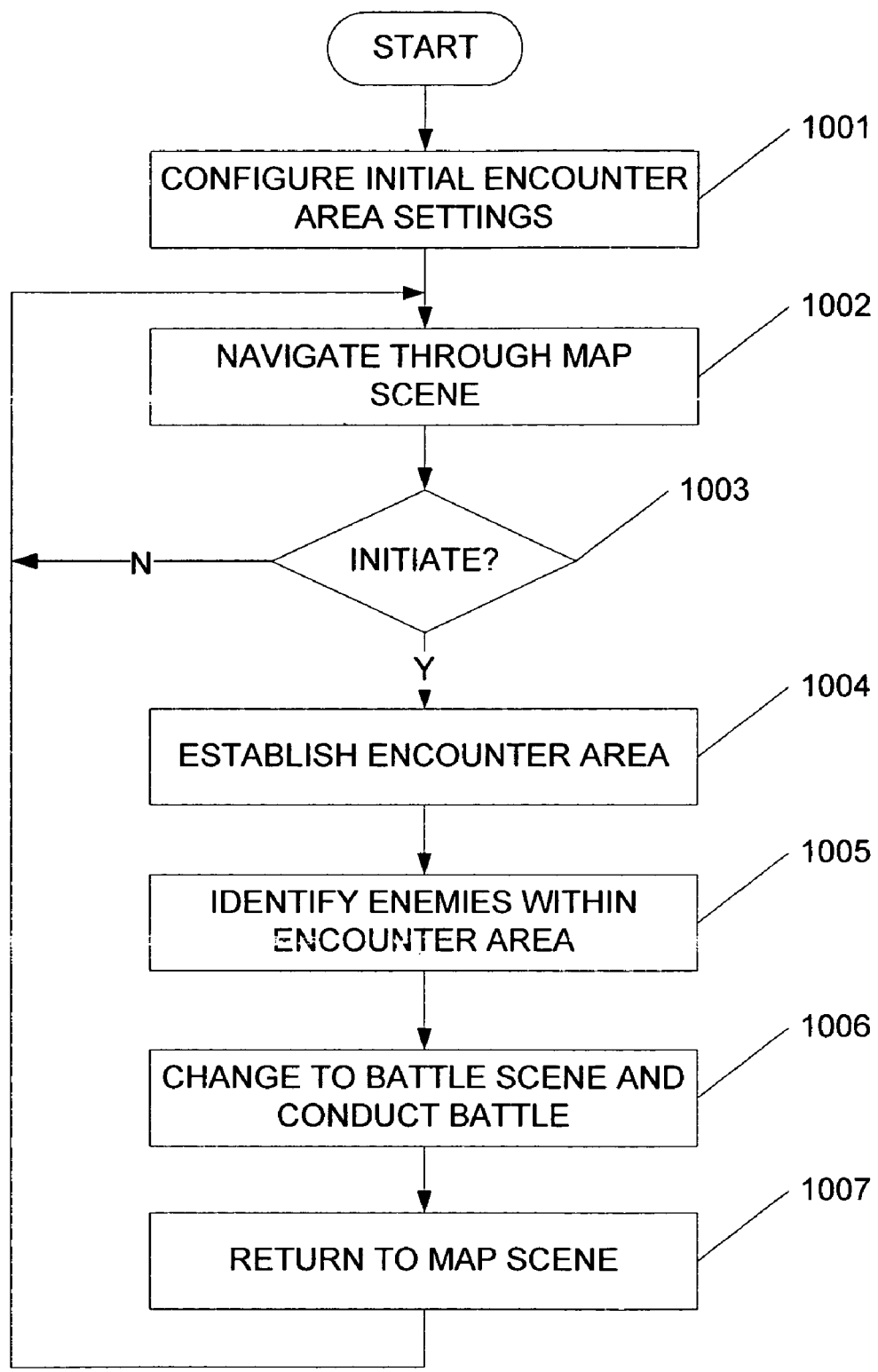
FIG. 10 illustrates an example process in which an encounter area may be used to populate a battle scene.

FIG. 10 illustrates a basic example process by which the features described herein may be implemented. The details for many of these steps are already discussed above, and might not be repeated here. In step 1001, initial settings affecting a future encounter area may be established. This may involve user-selectable difficulty settings, and consideration of the equipment and character attributes of the player's character (or party) to identify a basic encounter area shape and/or size. In step 1002, the player navigates through the map scene, moving the player's character through the RPG world, such as moving from one town to another. In step 1003, a check is made to determine whether an encounter is to be initiated. This may occur automatically, such as when an enemy character attacks, touches, or approaches the player's character, or it may occur in response to a player command, such as pressing an 'X' button on a controller 104.

If no encounter is initiated, the process may return to step 1002 to continue navigation through the map scene. If an encounter is initiated, step 1004 establishes the encounter area for the current situation. This may use the initial encounter area established in step 1001, but may also have modifications based on current player character status (e.g., wounded characters may have diminished attributes, equipment lost or broken, etc.), and/or based on player command (e.g., holding a button down longer, or pressing it harder, for a larger encounter area; initiating an attack from the map scene, etc.). This step may also include displaying the resulting encounter area.

In step 1005, the enemies located within the encounter area are identified for inclusion in the battle. This may include determinations as to whether enemies are located within the encounter area, and if the encounter was initiated by a player attack, which enemies are successfully hit by the player attack (or which players are within range of the attack). The identification may also include changing the appearance of the enemies on the map scene to indicate which enemies have been included in the encounter area.

In step 1006, the battle scene may replace the map scene, and the player may engage in combat with the enemies identified in step 1005. When the battle has ended, the game may return to the map scene in step 1007, to await the next encounter.

The features described above are preferably encoded in computer software as executable instructions that can be executed on a computing device, such as a personal computer or video game console, to result in the display of the screens shown in the figures. The executable instructions may be stored on a computer-readable medium, such as one or more computer disks, RAMs, CD-ROMs, DVDs, game cartridges, etc. Also, although various features are described above, it is not necessary to practice them all in the same embodiment. Instead, various combinations and subcombinations may be implemented as desired, and the true scope herein should only be limited by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A non-transitory computer-readable storage medium storing computer-executable instructions which when executed by a processor perform a method for dynamically adjusting the size of an encounter area in a video game, comprising:
   displaying a map scene including a player-controlled character and a plurality of enemy characters on a display device, wherein the map scene portrays a location of the player-controlled character with respect to a plurality of enemy characters in a topographical map display of the overall video game environment, and wherein no battle activities occur while the map scene is displayed;
   displaying, on the display device, a map scene encounter area in the map scene in response to a player command, the map scene encounter area encompassing an area of the map scene where a first plurality of the enemy characters is within the map scene encounter area, and a second plurality of the enemy characters is outside of the map scene encounter area;
   while the map scene encounter area is being displayed, receiving player input for dynamically adjusting a size of the map scene encounter area such that the number of enemy characters in the first plurality that is within the map scene encounter area changes, wherein the dynamic adjustment of the size of the map scene encounter area is independent of any attacks that the player-controlled character can perform during combat and based solely on the received player input;
   after dynamically adjusting the size of the map scene encounter area, receiving a player command to engage in combat with the first plurality of enemy characters that are encompassed by the adjusted map scene encounter area; and
   in response to the player command to engage in combat, replacing the map scene with a battle scene to resolve the combat between the player character and the first plurality of enemy characters that are encompassed by the adjusted map scene encounter area, the battle scene portraying the first plurality of enemy characters while omitting the second plurality of enemy characters;
   after displaying the battle scene, receiving player input to engage in battle activities with one or more of the first plurality of enemy characters that are displayed in the battle scene; and
   portraying, in the battle scene, the battle activities corresponding to the player input.

2. The non-transitory computer-readable storage medium of claim 1, the size of the map scene encounter area initially displayed in the map scene in response to a player command is based on a player character condition.

3. The non-transitory computer-readable storage medium of claim 1, wherein the step of dynamically adjusting the size of the map scene encounter area includes displaying an initial map scene encounter area immediately surrounding the player-controlled character, and increasing the map scene encounter area's size for a duration in which a player presses a button.

4. The non-transitory computer-readable storage medium of claim 1, wherein the step of dynamically adjusting the size of the map scene encounter area includes a step of identifying a pressure with which a player presses a button.

5. The non-transitory computer-readable storage medium of claim 1, wherein the map scene encounter area comprises an aggregation of a plurality of map scene encounter areas associated with a plurality of characters.

6. The non-transitory computer-readable storage medium of claim 1, wherein the shape of the map scene encounter area is variable depending on the type of attack initiated by the player.

7. The non-transitory computer-readable storage medium of claim 1, further comprising instructions for simulating perception behavior in the plurality of enemy characters to perceive actions of the player character, and instructions for enemy character behavior responsive to the perception behavior.

8. The non-transitory computer-readable storage medium of claim 1, further comprising instructions to simulate behavior of the second plurality of enemy characters during the battle scene; and to add one or more of the second plurality of enemy characters to the battle scene after the battle scene has begun.

9. The non-transitory computer-readable storage medium of claim 1, wherein said instructions further include instructions for the following:
   including in the battle scene all enemy characters that were within the map scene encounter area when the user command to engage in battle was received.

10. The non-transitory computer-readable storage medium of claim 1 further comprising displaying a transition animation between the map scene and the battle scene, the transition animation comprising at least one of fading or wiping.

11. The non-transitory computer-readable storage medium of claim 1 wherein the map scene encounter area has the shape of a shadow cast by the player-controlled character, and wherein dynamically adjusting the map scene encounter area comprises moving the player controlled character with respect to a light source in the map scene to encompass the first plurality of enemy characters.

12. The non-transitory computer-readable storage medium of claim 2, wherein the player character condition comprises the character's equipment.

13. The non-transitory computer-readable storage medium of claim 6, wherein the shape of the map scene encounter area further is variable depending on geographic features of an area of the map scene affected by the attack.

14. The non-transitory computer-readable storage medium of claim 13, wherein the map scene encounter area does not encompass the player character.

15. The non-transitory computer-readable storage medium of claim 7, wherein the enemy character behavior responsive to the perception behavior includes instructions to approach an area of a perceived event.

16. A video game method for dynamically adjusting the size of an encounter area, comprising the steps of:
   displaying a map scene including a player-controlled character and a plurality of enemy characters on a display device, wherein the map scene portrays a location of the player-controlled character with respect to a plurality of enemy characters in a topographical map display of the overall video game environment, and wherein no battle activities occur while the map scene is displayed;

displaying, on the display device, a map scene encounter area in the map scene in response to a player command, the map scene encounter area encompassing an area of the map scene where a first plurality of the enemy characters is within the map scene encounter area, and a second plurality of the enemy characters is outside of the map scene encounter area;

while the map scene encounter area is being displayed, receiving player input for dynamically adjusting a size of the map scene encounter area such that the number of enemy characters in the first plurality that is within the map scene encounter area changes prior to engaging in the battle activities, wherein the dynamic adjustment of the size of the map scene encounter area is independent of any attacks that the player-controlled character can perform during combat and based solely on the received player input;

after dynamically adjusting the size of the map scene encounter area, receiving a player command to engage in combat with the first plurality of enemy characters that are encompassed by the adjusted map scene encounter area; and in response to the player command to engage in combat, replacing the map scene with a battle scene to resolve the combat between the player character and the first plurality of enemy characters that are encompassed by the adjusted map scene encounter area, the battle scene portraying the first plurality of enemy characters while omitting the second plurality of enemy characters;

after displaying the battle scene, receiving player input to engage in battle activities with one or more of the first plurality of enemy characters that are displayed in the battle scene; and portraying, in the battle scene, the battle activities corresponding to the player input.

17. The method of claim 16, further comprising offering the player an option to cancel combat with the first plurality of enemy characters who are within the map scene encounter area.

18. The method of claim 16, wherein the size of the map scene encounter area initially displayed in the map scene in response to a player command is based on a player character condition.

19. The method of claim 16, further comprising altering an appearance of all enemy characters who are within the map scene encounter area, and offering the player an opportunity to cancel combat with the identified enemy characters.

20. The method of claim 16, wherein displaying, on the display device, a map scene encounter area in the map scene in response to a player command includes the following:

defining individual encounter areas for individual members of a plurality of characters represented by the player-controlled character; and aggregating the individual map scene encounter areas to form the map scene encounter area.

21. The method of claim 18, wherein the condition of the player character comprises the character equipment and at least one attribute characteristic.

* * * * *

UNITED STATES PATENT AND TRADEMARK OFFICE
CERTIFICATE OF CORRECTION

| | | |
|---|---|---|
| PATENT NO. | : 7,833,096 B2 | Page 1 of 1 |
| APPLICATION NO. | : 11/221792 | |
| DATED | : November 16, 2010 | |
| INVENTOR(S) | : Hironobu Sakaguchi et al. | |

It is certified that error appears in the above-identified patent and that said Letters Patent is hereby corrected as shown below:

In column 12, line 3, after "to" insert -- a --.

Signed and Sealed this
Second Day of August, 2011

David J. Kappos
*Director of the United States Patent and Trademark Office*